United States Patent
Yu et al.

(10) Patent No.: US 11,005,116 B2
(45) Date of Patent: May 11, 2021

(54) MEMBRANE-ELECTRODE ASSEMBLY FOR FUEL CELLS HAVING IMPROVED DURABILITY AND MANUFACTURING METHOD THEREOF

(71) Applicants: Hyundai Motor Company, Seoul (KR); Kia Motors Corporation, Seoul (KR)

(72) Inventors: Jung Han Yu, Gyeonggi-do (KR); Sukhwan Yun, Gyeonggi-do (KR); Jong Kil Oh, Gyeonggi-do (KR); In Yu Park, Seoul (KR); Jae Jun Ko, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 16/213,114

(22) Filed: Dec. 7, 2018

(65) Prior Publication Data
US 2020/0075983 A1    Mar. 5, 2020

(30) Foreign Application Priority Data

Sep. 5, 2018    (KR) .................. 10-2018-0105656

(51) Int. Cl.
*H01M 8/1004*    (2016.01)
*H01M 8/1018*    (2016.01)

(52) U.S. Cl.
CPC .. *H01M 8/1004* (2013.01); *H01M 2008/1095* (2013.01); *H01M 2250/20* (2013.01)

(58) Field of Classification Search
CPC .................................................. H01M 8/1004
See application file for complete search history.

(56) References Cited

U.S. PATENT DOCUMENTS

| | | | | |
|---|---|---|---|---|
| 2005/0089740 A1* | 4/2005 | Moon | ............... | H01M 4/9066 429/425 |
| 2012/0064437 A1* | 3/2012 | Kudo | ................... | H01M 4/921 429/524 |
| 2013/0020207 A1* | 1/2013 | Shao-Horn | ........... | H01M 4/525 205/635 |

FOREIGN PATENT DOCUMENTS

| | | |
|---|---|---|
| KR | 10-2013-0123189 A | 11/2013 |
| KR | 10-1572545 B1 | 11/2015 |
| KR | 10-1640639 B1 | 7/2016 |
| KR | 10-1751102 B1 | 6/2017 |
| KR | 10-1772264 B1 | 8/2017 |
| KR | 10-2017-0127625 A | 11/2017 |

OTHER PUBLICATIONS

Pena-Martinez et al. (Electrochimica Acta 52 (2007) 2950-2958).*

* cited by examiner

*Primary Examiner* — Olatunji A Godo
(74) *Attorney, Agent, or Firm* — Mintz Levin Cohn Ferris Glovsky and Popeo, P.C.; Peter F. Corless (57) ABSTRACT

Disclosed are a membrane-electrode assembly for fuel cells having improved durability and a manufacturing method thereof. Hydrogen peroxide, from which a hydroxyl radical is generated, may be removed using an antioxidant having the structure $A_{1-a}A'_aBO_{3-\delta}$ and including strontium or samarium, thereby improving the durability of an electrolyte membrane and an electrode.

12 Claims, 3 Drawing Sheets

MEMBRANE-ELECTRODE ASSEMBLY FOR FUEL CELLS HAVING IMPROVED DURABILITY AND MANUFACTURING METHOD THEREOF

CROSS-REFERENCE TO RELATED APPLICATION

This application claims, under 35 U.S.C. § 119(a), the benefit of priority to Korean Patent Application No. 10-2018-0105656 filed on Sep. 5, 2018, the entire contents of which are incorporated herein by reference.

TECHNICAL FIELD

The present invention relates to a membrane-electrode assembly for fuel cells having improved durability and a manufacturing method thereof.

BACKGROUND

Polymer electrolyte membrane fuel cells are devices that generate electricity using an electrochemical reaction between hydrogen and oxygen in the air, and are well-known as environmentally friendly next-generation energy sources that have high electricity-generation efficiency and emit almost no exhaust materials except for water. In addition, polymer electrolyte membrane fuel cells generally operate at a temperature of about 95° C. or less, and have high power density.

The reaction for electricity production by fuel cells occurs in a membrane-electrode assembly (MEA), which includes a perfluorinated sulfonic acid ionomer-based membrane and a pair of electrodes (e.g., an anode and a cathode). Hydrogen supplied to an anode, which is an oxidation electrode for fuel cells, is split into a proton and an electron. The proton is moved through the membrane to a reduction electrode, i.e. a cathode, and the electron is moved to the cathode via an exterior circuit. At the cathode, an oxygen molecule, the proton, and the electron react together to produce electricity and heat, and at the same time, water ($H_2O$) as a by-product.

In general, hydrogen and oxygen in the air, which are reaction gases for fuel cells, cross over through the electrolyte membrane to facilitate the production of hydrogen peroxide (HOOH). The hydrogen peroxide produces oxygen-containing radicals such as a hydroxyl radical (.OH) and a hydroperoxyl radical (.OOH). These radicals attack the perfluorinated sulfonic acid-based electrolyte membrane, inducing the chemical degradation of the membrane, which ultimately has the negative consequence of reducing the durability of fuel cells.

In the related arts, a representative catalyst for dissolving hydrogen peroxide through the following reaction, e.g. manganese dioxide ($MnO_2$), has been used. Manganese dioxide may have substantial antioxidation activity but still may be insufficient to prevent the chemical degradation of the perfluorinated sulfonic acid-based electrolyte membrane.

$MnO_2 + H_2O_2 + 2H+ \rightarrow Mn^{2+} + 2H_2O + O_2$ $Mn^{2+} + 2H_2O_2H \leftrightarrow Mn(OH)_2 + 2H^+$ $Mn(OH)_2 + H_2O_2 \rightarrow MnO_2 + 2H_2O$ (Total reaction: $2H_2O_2 \rightarrow 2H_2O + O_2$)

Further, in the related arts, a primary antioxidant for removing a hydroxyl radical, such as ceria ($CeO_2$, cerium oxide), zirconia ($ZrO_2$, zirconium oxide), or ceria-zirconia, has been used to prevent the chemical degradation of the electrolyte membrane. Since hydrogen peroxide is an elementary material, however, the function of an antioxidant for removing only a hydroxyl radical may be limited.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention may provide technology that may prevent the chemical degradation of an electrolyte membrane and improve the durability of the electrolyte membrane through the application of a secondary antioxidant for removing hydrogen peroxide, from which a hydroxyl radical is generated, during the operation of a fuel cell.

The term "antioxidant" as used herein refers to a compound that inhibit oxidation of the other compound. Preferably, the antioxidant may be included in a composition or a product to prevent oxidation of the other components in the composition. In certain embodiments, the antioxidant may be included in the membrane-electrode assembly in order to prevent oxidation and/or remove hydrogen peroxide formed therein.

The aspects of the present invention are not limited to those described above. The objects of the present invention will be clearly understood from the following description and could be implemented by means defined in the claims and a combination thereof.

In one aspect, provided is a membrane-electrode assembly for fuel cells having improved durability. The membrane-electrode assembly may include an electrolyte membrane and a pair of electrodes (e.g., cathode and anode) comprising a first electrode and a second electrode. Preferably, the first electrode may be formed on a first surface of the electrolyte membrane and the second electrode may be formed on a second surface of the electrolyte membrane. The first surface and the second surface are opposing surfaces of the electrolyte membrane.

Preferably, at least one of the electrolyte membrane and the electrodes may include an antioxidant. For example, the electrolyte membrane may include the antioxidant. Alternatively, one of the electrode (e.g., the first electrode or the second electrode) or the pair of the electrodes (e.g., the first electrode and the second electrode) may include the antioxidant. In addition, the electrolyte membrane and/or the one of the electrode (e.g., the first electrode or the second electrode) may include the antioxidant. Further, the electrolyte membrane and/or the pair of the electrodes (e.g., the first electrode and the second electrode) may include the antioxidant.

Preferably, the antioxidant may suitably include a compound represented by Formula 1:

$$A_{1-a}A'_aBO_{3-\delta},\qquad\text{[Formula 1]}$$

wherein A includes one or more selected from a group consisting of lanthanum(La), samarium (Sm), praseodymium(Pr), neodymium (Nd), promethium(Pm), europium (Eu), gadolinium(Gd), terbium(Tb), dysprosium (Dy), holmium (Ho), erbium(Er), thulium(Tm), ytterbium(Yb), lutetium (Lu), and a combination thereof, A' is any one selected from a group consisting of strontium (Sr), calcium (Ca), barium (Ba), yttrium(Y), tantalum(Ta), tungsten (W), rhenium (Re), osmium(Os), iridium(Ir), platinum (Pt), gold (Au), and a combination thereof, B is any one selected from a group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium (Ce). a is a number that is greater than 0 and less than 1.0, and δ is an oxygen vacancy value. The compound of Formula 1 may be electrically neutral.

The antioxidant may suitably include a compound represented by Formula 2:

$$La_{1-b}Sr_bMnO_{3-\delta},\qquad\text{[Formula 2]}$$

Wherein b is equal to or greater than 0.2 and less than 1, and δ is an oxygen vacancy value. The compound of Formula 2 may be electrically neutral.

Moreover, the antioxidant may suitably include a compound represented by Formula 3:

$$Sm_{1-c}Sr_cCoO_{3-\delta},\qquad\text{[Formula 3]}$$

Wherein c is equal to or more than 0.25 and equal to or less than 0.75, and δ is an oxygen vacancy value. The compound of Formula 3 may be electrically neutral.

The electrolyte membrane may include an amount of about 0.05 wt % to an amount of about 20 wt % of the antioxidant and an amount of about 80 wt % to 99.95 wt % of an ionomer based on the total weight of the electrolyte membrane.

The "ionomer membrane" preferably include ionomer as a main component. The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. In certain aspect, the ionomer may suitably include ionic groups involved in electron and/or proton transfer in an electrolyte of a membrane electrode assembly or a fuel cell.

Each of the electrodes (e.g., first electrode and second electrode; cathode or anode) may include an amount of about 37.5 wt % to 89.995 wt % of a catalyst, an amount of about 10 wt % to 50 wt % of an ionomer, and an amount of about 0.005 wt % to 12.5 wt % of the antioxidant, based on the total weight of the each of the electrode. The content of the catalyst may be suitably range from about 50 wt % to 79.99 wt %, the content of the ionomer may suitably range from about 20 wt % to about 40 wt %, and the content of the antioxidant may suitably from about 0.01 wt % to about 10 wt %, based on the total weight of the each of the electrode.

In another aspect, the present invention provides a method of manufacturing a membrane-electrode assembly for fuel cells having improved durability, the method including preparing an admixture including a precursor of element A, a precursor of element A', and a precursor of element B; preparing a gel composition including citric acid ($C_6H_8O_7 \cdot H_2O$) and the admixture; forming a gel from the gel composition; and calcinating the gel to obtain an antioxidant including a compound represented by Formula 1:

$$A_{1-a}A'_aBO_{3-\delta},$$

wherein A includes one or more selected from a group consisting of lanthanum(La), samarium (Sm), praseodymium(Pr), neodymium (Nd), promethium(Pm), europium (Eu), gadolinium(Gd), terbium(Tb), dysprosium (Dy), holmium (Ho), erbium(Er), thulium(Tm), ytterbium(Yb), lutetium (Lu), and a combination thereof, A' is any one selected from a group consisting of strontium (Sr), calcium (Ca), barium (Ba), yttrium(Y), tantalum(Ta), tungsten (W), rhenium (Re), osmium(Os), iridium(Ir), platinum (Pt), and gold (Au), Binclude one or more selected from a group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium(Ce), a is a number that is greater than 0 and less than 1.0, and δ is an oxygen vacancy value. The compound of Formula 1 may be electrically neutral.

The term "precursor" as used herein refers to a compound that may be converted, for example, by a chemical reaction (e.g., enzyme reaction, oxidation or reduction), into another compound, i.e. compound of interest or to produce. In certain aspect, the precursor may include a compound of nitrate, oxide, carbide, or salt that may be converted into other forms of compound including main element(s). For example, the precursor may be reacted with other agent or compound (e.g., acid or base) to provide main elements of the compound of interest.

The method may further include at least one steps including—manufacturing an electrolyte membrane including the antioxidant and an ionomer; and manufacturing an electrode including a catalyst, a catalyst support, an ionomer, and the antioxidant.

Preferably, the precursor of element A may suitably include nitrate of element A, the precursor of element A' may suitably include nitrate of element A', and the precursor of element B may suitably include nitrate of element B.

The gel may be calcinated at a temperature of about 300° C. to 1500° C.

The antioxidant may suitably include a compound represented by Formula 2:

$$La_{1-b}Sr_bMnO_{3-\delta},\qquad\text{[Formula 2]}$$

Wherein b is equal to or greater than 0.2 and less than 1, and δ is an oxygen vacancy value. The compound of Formula 2 may be electrically neutral.

In the method, the antioxidant may suitably include a compound represented by Formula 3:

$$Sm_{1-c}Sr_cCoO_{3-\delta},\qquad\text{[Formula 3]}$$

Wherein c is equal to or greater than 0.25 and equal to or less than 0.75, and δ is an oxygen vacancy value. The compound of Formula 3 may be electrically neutral.

Still provide is a fuel cell including the membrane-electrode assembly as described herein.

Further provided is a vehicle including the fuel cell as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In the specification, "~"-based may mean a compound corresponding to "~" or a derivative of "~". The derivative may mean a compound changed from a specific compound as long as the structure (e.g., core structure) or nature of the specific compound is not changed by the introduction of a functional group, oxidation, reduction, or substitution of atoms.

Figure 1:
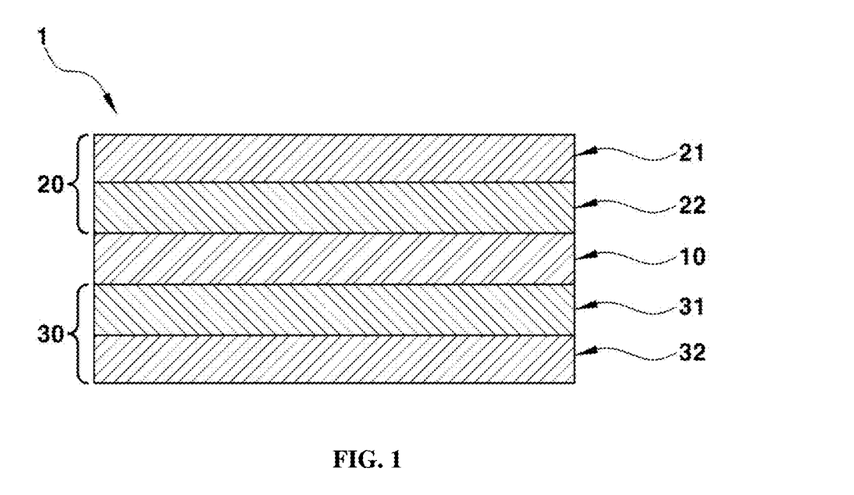
FIG. 1 shows an exemplary membrane-electrode assembly according to an exemplary embodiment of the present invention.

FIG. 1 schematically shows an exemplary membrane-electrode assembly 1 according to an exemplary embodiment of the present invention. As shown in FIG. 1, the membrane-electrode assembly 1 may include an electrolyte membrane 10 and a pair of electrodes 20 and 30 (e.g., cathode and anode; or first electrode or second electrode) formed on opposite surfaces (e.g., first and second surfaces) of the electrolyte membrane.

Preferably, "a pair of electrodes" means an anode 20 and a cathode 30, which face each other as the electrolyte membrane 10 is disposed between the pair of electrodes.

When describing the membrane-electrode assembly 1 according to an exemplary embodiment of the present invention with reference to FIG. 1, the electrolyte membrane 10 may suitably include an ionomer. In addition, the electrolyte membrane 10 may further include a reinforcement layer for increasing the mechanical rigidity of the electrolyte membrane.

The electrolyte membrane 10 may be formed of a single layer including an ionomer, or may be formed of a multi-layer structure, such as a three-layer structure, in which opposite surfaces of the electrolyte membrane 10 are impregnated with an ionomer.

A perfluorinated sulfonic acid-based ionomer, which may include super-acid negative ions (sulfonic acid) as introduced into a perfluorinated polymer that exhibits high resistance to chemicals, may suitably be used as the ionomer. For example, nafion, which is a kind of perfluorinated sulfonic acid-based ionomer, may suitably be used. However, the present invention is not limited thereto. Any perfluorinated sulfonic acid-based ionomer may be used as the ionomer of the present invention.

In the electrolyte membrane having the three-layer structure, the reinforcement layer may include expanded polytetrafluoroethylene (e-PTFE).

The electrodes 20 and 30 respectively may include catalyst layers 22 and 31, which contact the electrolyte membrane 10, and gas diffusion layers 21 and 32, which contact external gas.

Each of the catalyst layers 22 and 31 may suitably include a catalyst and an ionomer.

A metal component suitably used for the oxidation of hydrogen and the reduction of oxygen may be mainly included as the catalyst. Preferably, the catalyst may be used in a form of metal catalyst particles. Preferably, however, the catalyst may be used in the form of metal catalyst particles/carbon carrier or the metal catalyst supported on carbon support, in which metal catalyst particles may be coated on the surfaces of carbon particles, in order to increase the effective surface area of the catalyst.

Platinum (Pt) may be suitably used as the metal catalyst particles. Preferably, platinum/carbon carrier (Pt/C), which includes platinum component is supported on carbon support, may suitably be used as the metal catalyst particles. However, the present invention is not limited thereto. Any metal that may be suitable for the oxidation of hydrogen and the reduction of oxygen may be used.

The ionomer included in each of the catalyst layers 22 and 31 may be made of the same component as the electrolyte membrane 10 in order to transmit hydrogen ions generated by the anode 20 to the cathode 30. Preferably, the ionomer may serve as a hydrogen ion conductor. In addition, the ionomer may serve as a binder for physically coupling catalyst particles constituting the electrodes.

Each of the gas diffusion layers 21 and 32 of may suitably include a catalyst support including a porous carbon material.

The catalyst support may suitably include one or more selected from the group consisting of carbon paper, carbon paper coated with Teflon, carbon fabric (carbon cloth), and carbon fabric coated with Teflon. However, the present invention is not limited thereto. for instance, the catalyst support may supportthe catalyst layers 22 and 31, serve as a gas diffusion layer for diffusing reaction gas to the catalyst layers 22 and 31, serve as a current collector for moving current generated in the catalyst layers 22 and 31, and serve as a path for discharging generated water out of the catalyst layers 22 and 31.

In the present invention, the membrane-electrode assembly 1 may further include an antioxidant.

The antioxidant of the present invention may be included in at least one of electrodes 20 and 30 and the electrolyte membrane 10 of the membrane-electrode assembly 1. For example, the electrolyte membrane may include the antioxidant. Alternatively, one of the electrode (e.g., the cathode or the anode) or the pair of the electrodes (e.g., the cathode and the anode) may include the antioxidant. In addition, the electrolyte membrane and/or the one of the electrode (e.g., the cathode or the anode) may include the antioxidant.

Further, the electrolyte membrane and/or the pair of the electrodes (e.g., the cathode and the anode) may include the antioxidant.

In the present invention, the antioxidant may suitably include a compound represented by Formula 1.

[Formula 1]

In Formula 1, A may suitably include one or more selected from the group consisting of lanthanum(La), samarium (Sm), praseodymium(Pr), neodymium (Nd), promethium (Pm), europium (Eu), gadolinium(Gd), terbium(Tb), dysprosium (Dy), holmium (Ho), erbium(Er), thulium(Tm), ytterbium(Yb), and lutetium(Lu).

A' may be any one selected from the group consisting of strontium (Sr), calcium (Ca), barium(Ba), yttrium(Y), tantalum(Ta), tungsten (W), rhenium (Re), osmium(Os), iridium(Ir), platinum (Pt), gold (Au), and a combination thereof.

B may suitably include one or more selected from the group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium(Ce).

Preferably, a is a number that is greater than 0 and less than 1.0, and δ is an oxygen vacancy value making the compound of Formula 1 electrically neutral.

In Formula 1, a portion of A in $A_aBO_{3-\delta}$ may be substituted by A' to deform a lattice structure formed by the compound, and the oxidation degree of B may be changed to actively induce redox. In addition, the antioxidant having the structure of Formula 1 may realize an oxygen deficiency structure, in which hydrogen peroxide is easily adsorbed, inducing the dissolution of hydrogen peroxide through the movement of oxygen.

The antioxidant may suitably include a compound represented by Formula 2 or Formula 3.

[Formula 2]

[Formula 3]

Where b is equal to or greater than 0.2 and less than 1, c is equal to or greater than 0.25 and equal to or less than 0.75, and δ is an oxygen vacancy value making the compound of Formula 2 or Formula 3 electrically neutral.

When b or c deviates from the above range, the redox reaction of manganese (Mn) or cobalt (Co) may be insufficient, such that the speed at which the antioxidant reacts to hydrogen peroxide may be reduced and the antioxidant may become structurally unstable.

Figure 2A:
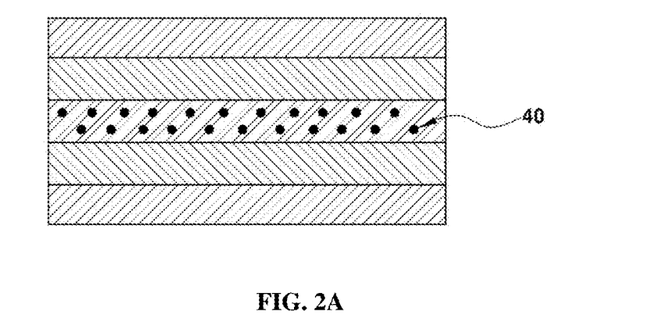
FIGS. 2A-2C show an exemplary membrane-electrode assembly, to which an exemplary antioxidant according to an exemplary embodiment of the present invention is applied.
Figure 2B:
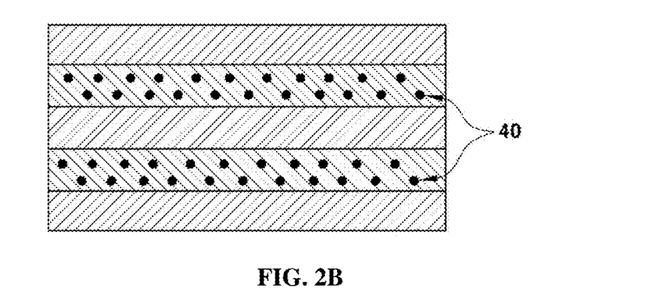
Figure 2C:
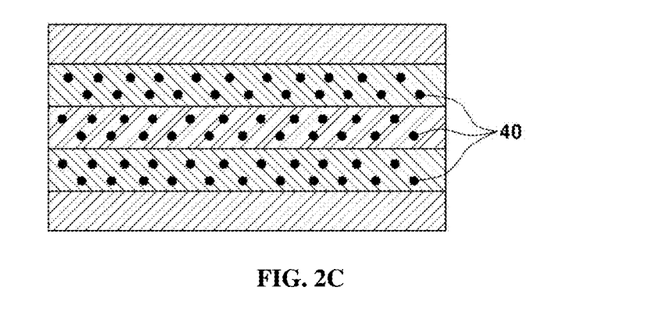

FIGS. 2A, 2B, and 2C show three cases in which an antioxidant 40 according to an exemplary embodiment of the present invention is included.

FIG. 2A shows that an exemplary antioxidant 40 may be included in the electrolyte membrane 10. The electrolyte membrane 10 may include the antioxidant in an amount of about 40 in an amount of about 0.05 wt % to 20 wt %, or particularly 0.1 wt % to 5 wt %, based on the total weight of the ionomer and the antioxidant 40. When the content of the antioxidant 40 is less than about 0.05 wt %, the chemical durability of the electrolyte membrane 10 may not be sufficiently improved due to excessively low antioxidation, and when the content of the antioxidant 40 is greater than about 20 wt %, the proton conductivity of the electrolyte membrane 10 may be decreased and brittleness thereof may be increased.

FIG. 2B shows that an exemplary antioxidant 40 may be included in the electrodes 22 and 31. Each of the electrodes 22 and 31 includes a catalyst, an ionomer, and the antioxidant 40. The content of the catalyst may suitably be of about 37.5 wt % to 89.995 wt %, the content of the ionomer may suitably be of about 10 w t % to 50 wt %, and the content of the antioxidant may suitably of about 0.005 wt % to 12.5 wt % based on the total weight of each of the electrode. Preferably, the content of the catalyst may be of about 50 wt % to 79.99 wt %, the content of the ionomer may be of about 20 wt % to 40 wt %, and the content of the antioxidant may be of about 0.01 wt % to 10 wt % based on the total weight of each of the electrode.

FIG. 2C shows that an exemplary antioxidant 40 may be included both in the electrolyte membrane 10 and in the electrodes 22 and 31. In other words, the membrane-electrode assembly may include both the case shown in FIG. 2A and the case shown in FIG. 2B. Preferably, the content of the antioxidant 40 may be the same as the antioxidant 40 shown in FIGS. 2A and 2B.

In another aspect, provided is a method of manufacturing a membrane-electrode assembly for fuel cells having improved durability. The method may include a step of preparing a admixture including a precursor of element A, a precursor of element A', and a precursor of element B, a step of preparing a gel composition including citric acid and the admixture; forming a gel from the gel composition, for example, by stirring the gel composition, and a step of calcinating the gel to obtain an antioxidant including a compound represented by Formula 1.

$$A_{1-a}A'_aBO_{3-\delta}$$ [Formula 1]

In Formula 1, A may suitably include one or more selected from the group consisting of lanthanum(La), samarium (Sm), praseodymium(Pr), neodymium (Nd), promethium (Pm), europium (Eu), gadolinium(Gd), terbium(Tb), dysprosium (Dy), holmium (Ho), erbium(Er), thulium(Tm), ytterbium(Yb), and lutetium(Lu).

A' may suitably include one or more selected from the group consisting of strontium (Sr), calcium (Ca), barium (Ba), yttrium (Y), tantalum(Ta), tungsten (W), rhenium (Re), osmium(Os), iridium(Ir), platinum (Pt), and gold (Au).

B may suitably include one or more selected from the group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium(Ce). Preferably, a is a number that is greater than 0 and less than 1.0, and δ is an oxygen vacancy value making the compound of Formula 1 electrically neutral.

Preferably, the precursor of element A may include nitrate including element A, the precursor of element A' may include nitrate including element A', and the precursor of element B may include nitrate including element B.

The admixture may be prepared in consideration of the mole ratio of the respective precursors.

The prepared admixture may be stirred and then an excessive amount of citric acid ($C_6H_8O_7 \cdot H_2O$) may be introduced into the admixture to obtain a gel composition.

The gel composition may be stirred at a temperature of about 80° C.

The gel may be calcinated at a temperature of about 300° C. to 1500° C. for a predetermined amount of time to obtain the antioxidant. The calcination may suitably be performed in an air atmosphere.

The manufacturing method may further include a step of manufacturing an electrolyte membrane including the antioxidant and an ionomer; and/or a step of manufacturing an electrode including a catalyst, a catalyst support, an ionomer, and the antioxidant.

The step of manufacturing the electrolyte membrane including the antioxidant and the ionomer may be performed differently when the electrolyte membrane has a single layer including only an ionomer and when the electrolyte membrane has a three-layer structure in which opposite surfaces of a reinforcement layer are impregnated with an ionomer.

When the electrolyte membrane has a single layer, the ionomer, in which the antioxidant is dispersed, may be heat-treated at a low temperature or a high temperature to reduce variation in the dimensions of the ionomer, and electrodes may be bonded to opposite surfaces of the heat-treated electrolyte membrane.

When the electrolyte membrane has a three-layer structure, the reinforcement layer may be heat-treated at a low temperature or a high temperature to reduce variation in the dimensions thereof, the reinforcement layer may be impregnated with an ionomer having an antioxidant dispersed therein to manufacture an electrolyte membrane, and electrodes may be bonded to opposite surfaces of the electrolyte membrane.

Since the performance of a fuel cell is reduced when the ionomer is degenerated, high-temperature heat treatment may be preferably performed at a glass transition temperature Tg of the ionomer.

For example, when manufacturing the electrode including the catalyst, the catalyst support, the ionomer, and the antioxidant, catalyst ink including a catalyst, an antioxidant, and an ionomer may be coated and dried on a decal transfer film to obtain an electrode sample coated on the decal transfer film.

Preferably, the catalyst ink may be manufactured by mixing a platinum catalyst carried on carbon and an ionomer with a solvent such as isopropyl alcohol and stirring and ultrasonicating the mixture. The catalyst ink may be coated and sufficiently dried on a decal transfer film to manufacture an electrode sample.

For instance, the decal transfer film may suitably include one or more polymers which exhibit excellent physical properties and high separability from an electrode at the time of manufacturing a membrane-electrode assembly through hot pressing or roll lamination, for example, one or more, selected from among polytetrafluoroethylene (PTFE), polyethylene terephthalate (PET), polybutylene terephthalate (PBT), polytrimethylene terephthalate (PTT), polyethylene naphthalate (PEN), and polyimide (PI).

The manufacture electrode sample may be transferred (decaled) to opposite surfaces of the electrolyte membrane, for example, by hot pressing to manufacture a membrane-electrode assembly having a three-layer or five-layer structure.

Subsequently, a gas diffusion layer including the catalyst support of the present invention may be fastened to opposite surfaces of the membrane-electrode assembly having the three-layer or five-layer structure to manufacture a membrane-electrode assembly having a five-layer or seven-layer structure.

EXAMPLE

Example 1

Nitrate including lanthanum(La), i.e. $La(NO_3)_3 \cdot nH_2O$, nitrate including strontium (Sr), i.e. $Sr(NO_3)_2$, and nitrate including manganese (Mn), i.e. $Mn(NO_3)_2 \cdot nH_2O$, were weighed so as to satisfy the composition ratio of the compound represented by Formula 4, and were then mixed to prepare an admixture.

The admixture was stirred in the state in which an excessive amount of citric acid was introduced into the admixture to obtain a gel. At this time, the stirring was performed at a temperature of about 80° C. for several hours until the admixture gelled.

The gel was calcinated at a temperature of about 1000° C. for about 2 hours to obtain a compound represented by Formula 4, i.e. an antioxidant.

$$La_{0.8}Sr_{0.2}MnO_{3-\delta},\quad [\text{Formula 4}]$$

Wherein δ is an oxygen vacancy value making the compound of Formula 4 electrically neutral.

Example 2

Nitrate including samarium (Sm), i.e. $Sm(NO_3)_3 \cdot nH_2O$, nitrate including strontium (Sr), i.e. $Sr(NO_3)_2$, and nitrate including cobalt (Co), i.e. $Co(NO_3)_2 \cdot nH_2O$, were weighed so as to satisfy the composition ratio of the compound represented by Formula 5, and were then mixed to prepare a mixed aqueous solution.

Subsequent steps were performed identically to those of Example 1.

Finally, a compound represented by Formula 5, i.e. an antioxidant, was obtained.

$$Sm_{0.5}Sr_{0.5}CoO_{3-\delta},\quad [\text{Formula 5}]$$

Wherein δ is an oxygen vacancy value making the compound of Formula 5 electrically neutral.

Experimental Example

The antioxidation and durability of the antioxidants according to Example 1 and Example 2 were evaluated as follows. At this time, no antioxidant was used in Comparative Example 1, $MnO_2$ was used as an antioxidant in Comparative Example 2, and $BaZr_{0.85}Y_{0.15}O_3$(BZY) was used as an antioxidant in Comparative Example 3. The antioxidants of Example 1, Example 2, and Comparative Examples 1 to 3 are shown in Table 1.

TABLE 1

| Classification | Kind of antioxidant |
| --- | --- |
| Example 1 | $La_{0.8}Sr_{0.2}MnO_{3-\delta}$ |
| Example 2 | $Sm_{0.5}Sr_{0.5}CoO_{3-\delta}$ |
| Comparative Example 1 | — |
| Comparative Example 2 | $MnO_2$ |
| Comparative Example 3 | $BaZr_{0.85}Y_{0.15}O_3$(BZY) |

Evaluation of Antioxidation

Antioxidation of the antioxidants according to Example 1, Example 2, and Comparative Examples 1 to 3 was evaluated using a methyl violet method.

Methyl violet was mixed with iron (II) sulfate heptahydrate ($FeSO_4 \cdot 7H_2O$), and hydrogen peroxide in the ratio of 1:25 mol % to manufacture a total of 10 g of a methyl violet testing solution. 0.1 g of the antioxidants according to Example 1, Example 2, and Comparative Examples 1 to 3 were added to the methyl violet testing solution to manufacture 1 wt % of mixed solutions. After 24 hours, changes in the color of the mixed solutions were observed. Results are shown in FIG. 3.

Figure 3:
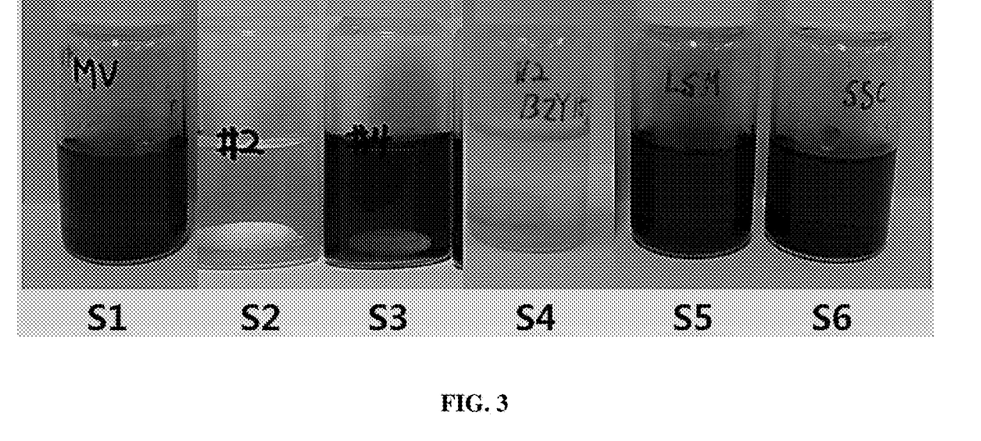
FIG. 3 is a photograph showing the results of measurement of antioxidation of Example 1, Example 2, Comparative Example 1, and Comparative Example 2 using a methyl violet method based on a change in color.

As shown in FIG. 3, in Comparative Example 1, no change in color was observed since no antioxidant was added.

In the methyl violet method, when decomposition of hydrogen peroxide increases, the original color, i.e. violet, of methyl violet is maintained well, and when hydrogen peroxide is not decomposed by an antioxidant, no violet appears.

Example 1 (S5), Example 2 (S6), Comparative Example 2 (S3), and Comparative Example 3 (S4), in each of which the antioxidant was added, were observed based on these characteristics. In Example 1 (S5), Example 2 (S6), and Comparative Example 2 (S3), the original color of methyl violet, i.e. violet, appeared. In Comparative Example 3 (S4), hydrogen peroxide was not sufficiently decomposed, whereby the violet color abruptly disappeared.

As a result, Example 1 (S5), Example 2 (S6), and Comparative Example 2 (S3) had excellent antioxidation and that antioxidation was greatly reduced in Comparative Example 3 (S4).

Evaluation of Durability

In order to verify the antioxidation exhibited by an electrolyte membrane, the antioxidants according to Example 1, Example 2, Comparative Example 1, and Comparative Example 2 were soaked in a Fenton solution for 3 days, and a fluorine emission rate (FER) was measured.

An antioxidant was added in an amount of about 1 wt % based on the weight of a dried electrolyte membrane, and a bar coating process was performed to prepared an electrolyte membrane having the antioxidant added thereto. The prepared electrolyte membrane was cut to a longitudinal size of 5 cm and a vertical size of 5 cm.

Deionized water, iron (II) sulfate heptahydrate, and hydrogen peroxide were mixed at a weight ratio of 1:0.00085:0.4 to prepare a Fenton solution. The electrolyte membranes of the Example 1, Example 2, and Comparative Examples 1 to 3 manufactured using the above method were soaked in the solution, and were reacted in an oven at 80° C. for 1 day. A fluorine emission rate was analyzed using the reacted Fenton solution. The results are shown in FIG. 4.

As the result of reaction between the Fenton solution and the electrolyte membrane, the electrolyte membrane having no antioxidant added thereto was degraded by radicals included in the Fenton solution, emitting fluoride ions ($F^-$). After a predetermined amount of time, the concentration of fluoride ions included in the Fenton solution was measured to evaluate the durability of the electrolyte membrane.

Figure 4:
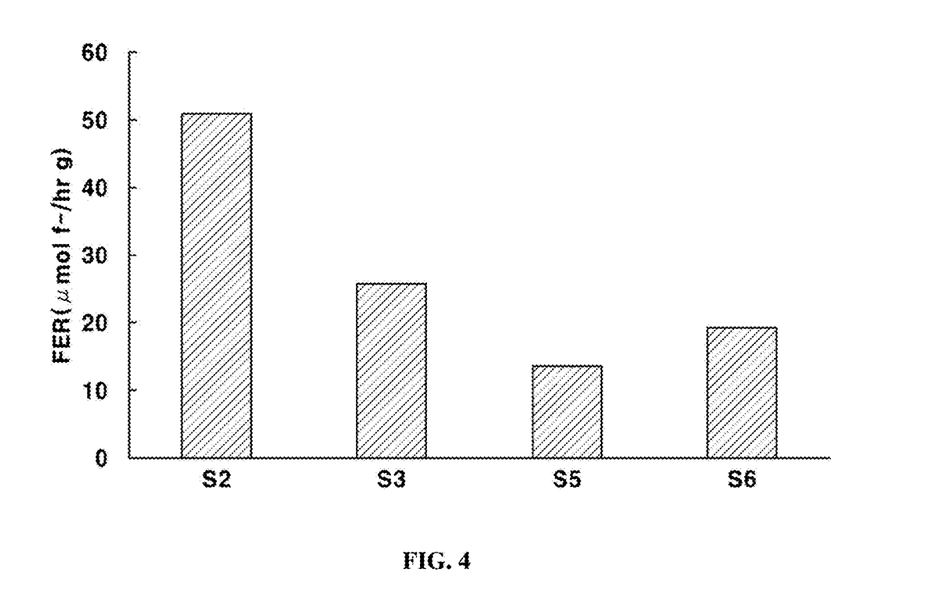
FIG. 4 is a graph showing the results of measurement of a fluorine ion emission speed of Example 1, Example 2, Comparative Example 1, and Comparative Example 2.

As shown in FIG. 4, the fluorine emission rate of the electrolyte membrane having no antioxidant added thereto according to Comparative Example 1 (S2) was about 51 μmol/g·hr, the fluorine emission rate of the electrolyte membrane having a new antioxidant LSM added thereto according to Example 1 (S5) was 13.5 μmol/g·hr, and the fluorine emission rate of the electrolyte membrane having a new antioxidant SSC added thereto according to Example 2 (S6) was 19.3 μmol/g·hr. Meanwhile, Comparative Example 2 (S3) had a fluorine emission rate of 25.8 μmol/g·hr. Consequently, Example 1 (S5) and Example 2 (S6) had higher antioxidation than Comparative Example 2 (S3), which had conventional antioxidation properties, as well as Comparative Example 1.

Total Experimental Results

Antioxidation and durability of the electrolyte membranes according to Example 1, Example 2, and Comparative Examples 1 to 3 are shown in Table 2.

TABLE 2

| Classification | Antioxidation | Durability of electrolyte membrane |
| --- | --- | --- |
| Example 1 | Excellent | Excellent |
| Example 2 | Excellent | Excellent |
| Comparative Example 1 | Poor | Poor |
| Comparative Example 2 | Excellent | Inferior |
| Comparative Example 3 | Poor | — |

As shown in Table 2, antioxidation of the antioxidants LSM and SSC according to Example 1 and Example 2 was greatly improved and that the durability of the electrolyte membranes having the antioxidants added thereto was also greatly improved.

As is apparent from the foregoing, the present invention relates to a membrane-electrode assembly for fuel cells having improved durability and a manufacturing method thereof. Hydrogen peroxide, from which a hydroxyl radical is generated, may be removed using an exemplary antioxidant according to an exemplary embodiment of the present invention, thereby improving the durability of an electrolyte membrane and an electrode.

The effects of the present invention are not limited to those mentioned above. It should be understood that the effects of the present invention include all effects that can be inferred from the foregoing description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A membrane-electrode assembly for fuel cells, comprising:
   an electrolyte membrane; and
   a pair of electrodes comprising a first electrode and a second electrode, wherein the first electrode is formed on a first surface of the electrolyte membrane and the second electrode is formed on a second surface, and the first surface and the second surface are opposing surfaces of the electrolyte membrane,
   wherein the electrolyte membrane comprises an antioxidant, and
   the antioxidant comprises a compound represented by Formula 1:

$$A_{1-a}A'_{a}BO_{3-\delta},\qquad\text{[Formula 1]}$$

wherein A comprises one or more selected from the group consisting of lanthanum(La), samarium (Sm), praseodymium(Pr), neodymium (Nd), promethium(Pm), europium (Eu), gadolinium(Gd), terbium(Tb), dysprosium (Dy), holmium (Ho), erbium(Er), thulium(Tm), ytterbium(Yb), and lutetium(Lu),
   A' comprises one or more selected from the group consisting of strontium (Sr), calcium (Ca), barium(Ba), yttrium(Y), tantalum(Ta), tungsten (W), rhenium (Re), osmium(Os), iridium(Ir), platinum (Pt), and gold (Au),
   B comprises one or more selected from the group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium(Ce),
   a is a number that is greater than 0 and less than 1.0, and
   $\delta$ is an oxygen vacancy value making the compound of Formula 1 electrically neutral, and
   wherein the electrolyte membrane comprises an amount of about 0.05 wt % to 20 wt % of the antioxidant and an amount of about 80 wt % to 99.95 wt % of an ionomer based on the total weight of the electrolyte membrane.

2. The membrane-electrode assembly according to claim 1, wherein the antioxidant comprises a compound represented by Formula 2:

$$La_{1-b}Sr_{b}MnO_{3-\delta},\qquad\text{[Formula 2]}$$

Wherein b is equal to or greater than 0.2 and less than 1, and $\delta$ is an oxygen vacancy value making the compound of Formula 2 electrically neutral.

3. The membrane-electrode assembly according to claim 1, wherein the antioxidant comprises a compound represented by Formula 3:

$$Sm_{1-c}Sr_{c}CoO_{3-\delta},\qquad\text{[Formula 3]}$$

Wherein c is equal to or greater than 0.25 and equal to or less than 0.75, and $\delta$ is an oxygen vacancy value making the compound of Formula 3 electrically neutral.

4. The membrane-electrode assembly according to claim 1, wherein each of the electrodes comprises an amount of about 37.5 wt % to 89.995 wt % of a catalyst, an amount of about 10 wt % to 50 wt % of an ionomer, and an amount of about 0.005 wt % to 12.5 wt % of the antioxidant based on the total weight of each of the electrodes.

5. A method of manufacturing a membrane-electrode assembly for fuel cells, comprising:
   preparing an admixture comprising a precursor of element A, a precursor of element A', and a precursor of element B;
   preparing a gel composition comprising citric acid ($C_6H_8O_7.H_2O$) and the admixture;
   forming a gel from the gel composition;
   calcinating the gel to obtain an antioxidant including a compound represented by Formula 1; and
   manufacturing an electrolyte membrane comprising the antioxidant and an ionomer:

$$A_{1-a}A'_{a}BO_{3-\delta},\qquad\text{[Formula 1]}$$

wherein A comprises one or more selected from the group consisting of lanthanum(La), samarium (Sm), praseodymium(Pr), neodymium (Nd), promethium(Pm), europium (Eu), gadolinium(Gd), terbium(Tb), dysprosium (Dy), holmium (Ho), erbium(Er), thulium(Tm), ytterbium(Yb), and lutetium(Lu),
   A' comprises one or more selected from the group consisting of strontium (Sr), calcium (Ca), barium(Ba), yttrium(Y), tantalum(Ta), tungsten (W), rhenium (Re), osmium(Os), iridium(Ir), platinum (Pt), and gold (Au),
   B comprises one or more selected from the group consisting of manganese (Mn), cobalt (Co), magnesium (Mg), titanium (Ti), iron (Fe), nickel (Ni), copper (Cu), zinc (Zn), gallium (Ga), yttrium(Y), zirconium(Zr), and cerium(Ce), a is a number that is greater than 0 and less than 1.0, and δ is an oxygen vacancy value making the compound of Formula 1 electrically neutral, and wherein the electrolyte membrane comprises an amount of about 0.05 wt % to 20 wt % of the antioxidant and an amount of about 80 wt % to 99.95 wt % of an ionomer based on the total weight of the electrolyte membrane.

6. The method according to claim 5, further comprising:
manufacturing an electrode comprising a catalyst, a catalyst support, an ionomer, and the antioxidant.

7. The method according to claim 5, wherein the precursor of element A comprises a nitrate of element A, the precursor of element A' comprises a nitrate of element A', and the precursor of element B comprises a nitrate of element B.

8. The method according to claim 5, wherein the gel is calcinated at a temperature of about 300° C. to 1500° C.

9. The method according to claim 5, wherein the antioxidant comprises a compound represented by Formula 2:

$$La_{1-b}Sr_bMnO_{3-\delta},$$ [Formula 2]

wherein b is equal to or greater than 0.2 and less than 1, and δ is an oxygen vacancy value making the compound of Formula 2 electrically neutral.

10. The method according to claim 5, wherein the antioxidant comprises a compound represented by Formula 3:

$$Sm_{1-c}Sr_cCoO_{3-\delta},$$ [Formula 3]

Wherein c is equal to or greater than 0.25 and equal to or less than 0.75, and δ is an oxygen vacancy value making the compound of Formula 3 electrically neutral.

11. A fuel cell comprising a membrane-electrode assembly according to claim 1.

12. A vehicle comprising a fuel cell according to claim 11.

* * * * *